May 1, 1956     E. K. KARLSSON     2,743,784
IMPLEMENT CARRIER
Filed June 12, 1953
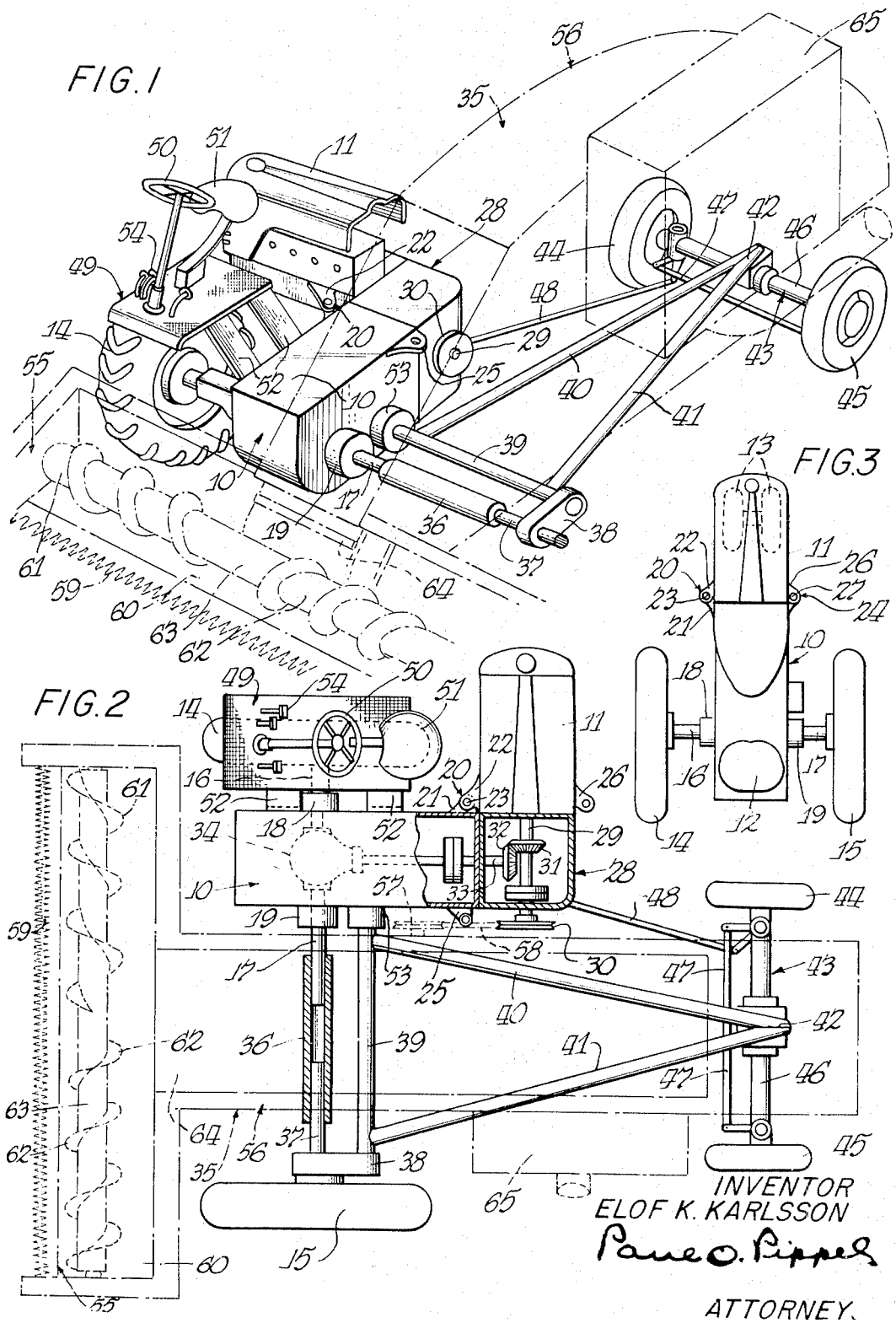
INVENTOR
ELOF K. KARLSSON
ATTORNEY

United States Patent Office 2,743,784
Patented May 1, 1956

2,743,784
IMPLEMENT CARRIER

Elof K. Karlsson, Moline, Ill., assignor to International Harvester Company, a corporation of New Jersey Application June 12, 1953, Serial No. 361,123

1 Claim. (Cl. 180—53)

This invention relates to a new and improved implement carrier.

Agricultural tractors are employed principally for pulling or carrying in one manner or another implements over fields. Many of the implements are known as "pull behind" implements and still others are known as "direct mounted" implements. It has been difficult to design a tractor which will universally adapt itself to all classes and types of implements and their particular means of mounting on the tractor. In other words, when an agricultural tractor is suitably arranged to accommodate a trailing implement such as cultivating tools or the like, it very often is not adaptable to receive some of the larger harvesting implements in a direct mounted fashion.

It is, therefore, a principal object of this invention to provide an agricultural tractor which has its component elements arranged in a position to facilitate use of the tractor as a means for receiving a mounted implement.

Another important object of this invention is the provision of means in an agricultural tractor for pivotally mounting the engine with respect to the tractor chassis, so that it might be positioned either in longitudinal alignment with the tractor chassis or at right angles to the tractor chassis to facilitate the mounting of various implements thereon.

Another and further important object of this invention is to supply an agricultural tractor with means for inserting an auxiliary gear mechanism for the purpose of securing adequate driving means for various implements which might be mounted on or pulled by the tractor.

A still further important object of this invention is to provide means for converting a relatively standard tricycle type tractor into a universally employed power unit upon which large harvesting implements may be mounted.

Another and still further important object of this invention is to equip an agricultural tractor of relatively standard construction with means for converting the tractor into a 2-wheel power unit with relatively widely spaced apart traction wheels, in order to receive relatively large harvesting implements thereon and utilizing an auxiliary implement frame to obtain stabilizing of the driving vehicle.

Another and further important object of this invention is the provision of a tractor carrier for relatively large implements wherein the component parts of the tractor carrier are arranged with the engine at right angles to the differential housing and including an operator's station over one of the traction wheels whereby there is provided a carrier for more convenient mounting of implements thereon, a better weight distribution, and convenient drive for mounted implements.

Other and further important objects and advantages of this invention will become apparent from the disclosures in the following specification and accompanying drawings.

In the drawings:

Figure 1 is a perspective view showing a harvester thresher in outline mounted on the tractor of this invention;

Figure 2 is a top plan view of the device as shown in Figure 1; and

Figure 3 is a top plan view of the tractor of this invention in its arrangement as a standard tricycle tractor.

As shown in the drawings:

The reference numeral 10 as best shown in Figure 3 indicates generally a longitudinally extending tractor chassis or differential housing having an engine 11 mounted at one end and an operator's seat 12 mounted at the other end. The chassis or housing 10 is supported at its one end by dirigible wheels 13 beneath the engine portion 11 and relatively widely spaced apart large traction wheels 14 and 15 beneath the seat portion of the chassis or housing. The large traction wheels 14 and 15 are mounted on axles 16 and 17, respectively, which are supported in housings 18 and 19 forming a part of the chassis 10. The wheels 13, although being two in number, are arranged in the manner of a single wheel so that the tractor in its entirety is a relatively standard tricycle type tractor. In order to facilitate effective operation of the conversion of the tractor to enable it to receive the large implement such as the harvester thresher as shown in Figures 1 and 2, the steerable wheels 13 are removed from the engine part of the chassis 10.

The present invention has for its principal concept the hinging of the engine part 11 with respect to the chassis or housing 10 in order to shift the engine from its "in line" or longitudinally extending position as shown in Figure 3 to a right angle position with respect to the chassis 10, such as shown in Figure 2. This is accomplished by a hinge device 20. The hinge 20 includes a hinge part 21 on the chassis 10, a hinge part 22 on the engine 11 and an adjoining vertically disposed hinge pin 23 which thus permits the engine part 11 to be swung in a horizontal plane toward and away from the remainder of the chassis 10. The other side of the chassis is provided with latch means 24 to enable the engine to be rigidly mounted in its line relationship with the chassis 10 if desired. The latch mechanism 24 includes a bracket part 25 on the chassis 10, a bracket part 26 on the engine 11 and a removable pin 27 joining the brackets 25 and 26 together. Thus, in order to convert the tricycle tractor to the device as shown in Figure 2 the pin 27 is withdrawn and the engine 11 swung about the hinge pin 23 so that the engine lies 90° apart from the chassis 10. It should be understood that the hinge mechanism 20 and the latch mechanism 24 are substantially identical and if it is desired to hinge the engine for movement in the other direction, then the hinge pin 23 could be removed and the engine swung about the removable latch pin 27.

As best shown in Figure 2, the tractor engine 11 has been moved to its right angle position about the hinge 20 and an auxiliary housing member 28 is interposed between the chassis 10 and the engine 11 so that the outer contour of the tractor chassis and engine presents a smooth, unbroken surface therearound. The housing 28 includes a shaft 29 driven by the engine 11. The shaft 29 continues directly through the housing 28 and carries a V-belt pulley 30 on the outer end thereof. The pulley 30 thus acts as a constant running power take-off means for driving the various elements of the harvesting machine mounted on the tractor. Within the housing 28 there is provided a bevel gear 31 fixedly mounted on the engine driven shaft 29, and this bevel gear is engaged by a bevel gear 32 disposed at right angles thereto and mounted on a shaft 33. The shaft 33 comprises the propeller shaft delivering rotational drive to a differential means 34 disposed in the end of the chassis or differential housing 10 substantially beneath the tractor seat. It will thus be seen that although the engine 11 is moved at right angles or out of line with respect to the differential housing 10, drive from the engine to the large traction wheels 14 and 15 may be continued. Further, the turning of the engine at right angles and providing space for the auxiliary or drive housing 28 permits the tractor to have a constant running power take-off pulley with which to drive the harvester thresher elements.

A still further conversion of the tractor is necessary to permit the mounting of the relatively large harvester thresher indicated by the numeral 35 to be mounted thereon. A sleeve 36 is mounted on the tractor axle 17 and the large traction wheel is provided with an additional axle member 37 which is inserted within the sleeve 36, thus providing for a substantial extension of the axle 17 and thus also a substantial spacing of the traction wheel 15 from the chassis 10. This, of course, provides the necessary space to permit the positioning of the harvester thresher separating body to be placed alongside the chassis and over the extended axle. As best shown in Figure 1, an arm 38 is journaled on the axle 37 and extends rearwardly for attachment to a cross shaft or tubular member 39. The tubular member 39 constitutes a part of a triangular frame structure having rearwardly and inwardly projecting side members 40 and 41. The rearward ends of the sides 40 and 41 are weldably or otherwise fastened together at 42 and form the support for an auxiliary steerable wheel truck identified generally by the numeral 43.

The wheel truck 43 includes laterally spaced steerable wheels 44 and 45 and an intermediate axle 46. The wheels are hingedly mounted with respect to the axle 46 and by means of a tie rod 47, the wheels may be turned concurrently and uniformly with respect to the cross axle 46. A connecting link 48 joins the steering mechanism on the wheel truck with a mechanism, not shown, beneath an auxiliary operator's platform 49 upon which is mounted a wheel 50 for controlling the angular positions of the dirigible wheels 44 and 45. Another operator's seat 51 is positioned on the platform 49 and enables the operator to sit in a position substantially over the large traction wheel 14, which is closely adjacent the differential housing and easily direct the movement of the large implement without visual interference of the large implement mounted on the tractor. The operator's platform 49 is supported by structure 52 removably fastened to the differential housing 10 and thereupon inclined laterally and upwardly to a position adjacent the large traction wheel 14.

The triangular frame structure has its final support on the side of the chassis 10 by means of a bushing 53 fixedly mounted on the side of the chassis and adapted to receive an end of the tubular member 39 opposite the end carried by the arm 38 from the wheel axle 37.

In addition to providing the steering wheel 50 and the operator's seat 51 on the platform 49, there is also provided all of the operating levers and pedals designated generally by the numeral 54 whereby the operator may conveniently effect a driving of the converted tractor vehicle from his new location over the large traction wheel 14. The linkage, not shown, joining the pedals 54 with the tractor chassis and engine is located beneath the operator's platform 49 and the supporting structure 52.

The converted tractor as shown in Figures 1 and 2 is now adequate in size to easily receive the largest of harvesting implements without imposing an undue burden thereon. The harvester thresher 35 includes a relatively wide harvesting part 55 and a substantially narrower but relatively massive longitudinally extending threshing and separating part 56. This longitudinal part is carried over the extended axle structure 17, 36 and 37 at its forward end and at its rearward end is carried over the wheel truck axle 46. The relatively wide harvesting unit 55 extends across the front of the tractor substantially covering the width between the widely spaced apart traction wheels 14 and 15. Diagrammatically, a V-belt pulley to be driven is shown at 57 on the side of the separator housing 56 and lies in the same plane with the constant running power take-off pulley 30. A V-belt 58 is shown joining the pulleys 30 and 57, thereby completing the chain of drive from the engine 11 to the harvester thresher implement.

In order to complete the description it should be explained that the harvesting part 55 includes a sickle 59 across the front edge of a platform 60 and by means of oppositely disposed screw flight 61 and 62 on a cross shaft member 63, grain cut by the sickle 59 is moved centrally of the platform 60 whereupon it is received by a feeder conveyor 64 to cause an upward and rearward delivery of the grain into the threshing and separating mechanism which has not been shown in detail. The threshed crop is deposited in a relatively large grain receiving tank 65 mounted at the side of the separator unit 56 and positioned between the dirigible wheel 45 and the large forwardly disposed traction wheel 15.

It is thus apparent that the tractor of this invention may be utilized to pull all types of agricultural implements through and across fields while arranged in its standard tricycle relationship as shown in Figure 3, and further that extremely large implements may be directly mounted thereon by carrying through the described conversion principles as shown in Figures 1 and 2 of the drawings. Harvester threshers such as shown at 35 in the drawings are large implements requiring considerable space and are not at all adaptable to mounting on a standard agricultural tractor. However, the tractor of this invention when converted, as shown in Figures 1 and 2, easily receives this large implement without undue cramping of parts. Obviously the showing of a harvester thresher is merely illustrative of the size of an implement which may be mounted on this tractor with the hinging engine and it should not be construed in any manner to limit the use of the tractor to the mounting of harvester threshers thereon.

Numerous details of construction may be varied throughout a wide range without departing from the principles disclosed herein and I, therefore, do not propose limiting the patent granted hereon otherwise than as necessitated by the appended claim.

What is claimed is:

An implement carrier comprising a longitudinally extending differential housing, a short transverse axle projecting from one side of said differential housing, a first traction wheel mounted on said short axle and flanking that side of the differential housing, an extended transversely disposed axle on the other side of said differential housing and in axial alignment with said short axle, a second traction wheel mounted on said extended axle and spaced from said differential housing a greater distance than the spacing of the first traction wheel from said differential housing, a longitudinally extending frame structure journaled on said extended axle at one end and having a wheel support at the other end thereof, a transversely disposed engine carried on and at right angles to said differential housing at one thereof and longitudinally aligned with and spaced from the first traction wheel, a drive housing connecting the engine to the differential housing, a power take-off element in line with said engine and extending out from said drive housing opposite the joining to said engine, an operator's station mounted over the first traction wheel and supported on said differential housing, and engine and drive control means positioned on said operator's station whereby implements may be easily mounted on said implement carrier with good operator visibility and convenience of implement drive.

References Cited in the file of this patent

UNITED STATES PATENTS

| | | |
|---|---|---|
| 1,926,928 | Yost et al. | Sept. 12, 1933 |
| 2,185,842 | Flogaus | Jan. 2, 1940 |
| 2,258,397 | Von Falkenhausen | Oct. 7, 1941 |
| 2,376,541 | Johnson et al. | May 22, 1945 |
| 2,435,563 | Acton | Feb. 10, 1948 |
| 2,482,251 | Downing | Sept. 20, 1949 |
| 2,513,942 | Johnson et al. | July 4, 1950 |
| 2,607,432 | Lommel | Aug. 19, 1952 |